(12) United States Patent
Ikeda

(10) Patent No.: US 8,522,808 B2
(45) Date of Patent: Sep. 3, 2013

(54) SAFETY VALVE FOR GASTIGHT BATTERY AND GASTIGHT BATTERY USING SAFETY VALVE

(75) Inventor: Akira Ikeda, Yamaguchi (JP)

(73) Assignee: Shenzhen Kedali Industry Co. Ltd., Shenzhen (CN)

( * ) Notice: Subject to any disclaimer, the term of this patent is extended or adjusted under 35 U.S.C. 154(b) by 426 days.

(21) Appl. No.: 12/981,141

(22) Filed: Dec. 29, 2010

(65) Prior Publication Data

US 2011/0236734 A1  Sep. 29, 2011

(30) Foreign Application Priority Data

Mar. 29, 2010  (JP) ................................. 2010-075998

(51) Int. Cl.
*F16K 17/40* (2006.01)
*H01M 2/12* (2006.01)

(52) U.S. Cl.
USPC .......................... 137/68.27; 220/89.2; 429/56

(58) Field of Classification Search
USPC ............... 137/68.23, 68.25, 68.27; 220/89.2; 429/56
See application file for complete search history.

(56) References Cited

U.S. PATENT DOCUMENTS

| | | | | |
|---|---|---|---|---|
| 4,245,010 A | * | 1/1981 | Golz | 429/56 |
| 6,182,704 B1 | * | 2/2001 | Bevacco | 137/68.27 |
| 6,265,097 B1 | * | 7/2001 | Konno et al. | 429/56 |
| 6,355,372 B2 | * | 3/2002 | Yamahira et al. | 429/56 |
| 7,140,380 B2 | * | 11/2006 | Marubayashi et al. | 137/68.27 |
| 2006/0078787 A1 | * | 4/2006 | Sato et al. | 429/56 |
| 2007/0059586 A1 | * | 3/2007 | Matsumoto et al. | 429/56 |
| 2007/0154782 A1 | * | 7/2007 | Cho et al. | 429/56 |
| 2008/0182159 A1 | * | 7/2008 | Mitani et al. | 429/56 |
| 2010/0136388 A1 | * | 6/2010 | Kim et al. | 429/56 |
| 2010/0159308 A1 | * | 6/2010 | Kim et al. | 429/56 |
| 2011/0212350 A1 | * | 9/2011 | Sato et al. | 429/56 |

FOREIGN PATENT DOCUMENTS

| | | |
|---|---|---|
| JP | 11-273640 | 10/1999 |
| JP | 2003-187774 | 7/2003 |
| JP | 2004-178909 | 6/2004 |
| JP | 2009-004271 | 1/2009 |

\* cited by examiner

*Primary Examiner* — John Rivell
(74) *Attorney, Agent, or Firm* — Browdy and Neimark, PLLC

(57) ABSTRACT

A safety valve for a battery which is mounted on a sealing plate for sealing an opening portion of a gastight battery case, and which can rapidly release a gas in the battery when a battery internal pressure is elevated is provided. In a safety valve for a gastight battery, a thin-wall valve element is formed on a sealing plate which seals an opening portion of a battery case, and the valve element is opened when a battery internal pressure becomes a predetermined value or more so as to release a gas in the battery to the outside of the battery. The safety valve includes: an outer annular groove formed of an annular thin wall which is formed on the periphery of the valve element and is provided for releasing the whole valve element; an inner annular groove formed of an annular thin wall which is arranged in an area inside the outer annular groove; and a connecting groove formed of a straight thin wall which connects the outer annular groove and the inner annular groove to each other. A wall thickness of the inner annular groove and a wall thickness of the connecting groove are set larger than a wall thickness of the outer annular groove.

5 Claims, 8 Drawing Sheets

Enlarged view

SAFETY VALVE FOR GASTIGHT BATTERY AND GASTIGHT BATTERY USING SAFETY VALVE

BACKGROUND OF THE INVENTION

1. Field of the Invention

The present invention relates to a safety valve for a gastight battery and a gastight battery using the safety valve, and more particularly to a safety valve having a valve element function which is communicated with the outside when a pressure in the battery becomes excessively large.

2. Description of the Related Art

With respect to a gastight battery, when an abnormal reaction occurs in the battery for some reasons so that a pressure in the battery is elevated, there exists a possibility that the gastight battery causes damages on a human body or objects due to the explosion of the battery per se. To avoid such a possibility, it is necessary to release a gas in the battery before the explosion occurs. A safety valve is provided to a battery case for this end.

The safety valve has a valve element which is broken and is opened with a predesigned internal pressure so as to release an internal gas to the outside. Although a break-open pressure is higher than a normal battery internal pressure in terms of required properties of the safety valve as a matter of course, it is desirable that the release pressure (operation pressure) is as low as possible in terms of safety.

Further, in the case where an amount of gas generated in the battery is large, when an area of the valve element through which the gas is released is small, the battery internal pressure is temporarily increased thus giving rise to a possibility that this increase of the battery internal pressure leads to the explosion.

Accordingly, it is important that a gas releasing portion which is formed by breaking an easy-to-break groove has an area sufficient for releasing an amount of gas generated in the battery.

Further, the gastight battery is used for a mobile phone, a digital camera or the like and hence, depending on the manner of handling such a device, there exists a possibility that a user falls the gastight battery on a ground or a floor so that the valve element portion is broken resulting in leakage of an electrolysis solution or the like. Accordingly, it is important that the valve element is not easily damaged when such a fall accident occurs so that the valve element is required to exhibit a high falling strength.

To satisfy the above-mentioned object, the gastight battery has a safety valve as a safety mechanism. As a method of forming the safety valve, there has been known a method in which a thin film having a predetermined size is formed in a sealing plate surface by pressing, etching or the like (a press valve or an imprinting valve).

Further, there has also been known a method in which a opened hole having a predetermined size is formed in a sealing plate surface, and a thin film is adhered to the opened hole as a valve element by cladding or welding (clad valve).

The clad valve has advantages such as a low operation pressure, a slightly larger release area and slightly larger fall strength which are required properties of a safety valve. However, the clad valve has a disadvantage that manufacturing steps of the clad valve require a pressing step and a cladding step so that the manufacturing steps are complicated and a manufacturing technique is difficult whereby a yield is low thus pushing up a cost.

To the contrary, in the manufacture of a press valve, a valve element can be formed in an inner surface of a sealing plate only by pressing so that the press valve can be manufactured at a low cost.

Further, the press valve can easily ensure a safety valve area of a predetermined size or more sufficient for releasing a gas. However, it is difficult for the press valve to acquire a stable low operation pressure compared to a clad valve.

Under such circumstances, the development of the press valve has been in progress along a precise bottom-dead-center control of a press device or the improvement and development of a proper material.

JP-A-11-273640 discloses a safety valve in which a dome-shaped thin-wall valve element is formed on a sealing plate, and an easy-to-break groove is formed in the vicinity of the periphery of the valve element.

JP-A-2005-135873 discloses a safety valve in which a thin-wall valve element is formed on a sealing plate, at least one dome portion which projects toward the inside of a battery is formed on the valve element, and a breaking groove which eases breaking of the valve element is formed on at least one peripheral mountain of the dome portion.

SUMMARY OF THE INVENTION

However, recently, along with the increase of battery capacity, an amount of gas which is generated in an abnormal state such as an overcharge is increased compared to the past. When a gas which is generated in an abnormal state is not released at a stretch from a opened hole of a safety valve, there is a possibility of explosion of a battery case. The above-mentioned safety valves of the prior art cannot cope with such a drawback.

Accordingly, it is an object of the present invention to provide a safety valve for a battery provided to a sealing plate for sealing an opening portion of a gastight battery case, which can rapidly release a gas in the battery when a battery internal pressure is elevated and a gastight battery which uses such a safety valve.

(1) According to one aspect of the present invention, there is provided a safety valve for a gastight battery in which a thin-wall valve element is formed on a sealing plate which seals an opening portion of a battery case, and the valve element is opened when a battery internal pressure becomes a predetermined pressure or more so as to release a gas in the battery to the outside of the battery, the safety valve including: an outer annular groove formed of an annular thin wall which is formed on the periphery of the valve element and is provided for peeling off the whole valve element; an inner annular groove formed of an annular thin wall which is arranged in an area inside the outer annular groove; and a connecting groove formed of a straight thin wall which connects the outer annular groove and the inner annular groove, wherein the outer annular groove, the inner annular groove and the connecting groove are formed on the same side of the sealing plate which is an upper side of sealing plate forming an outer side of the battery, a lower side of the sealing plate forming an inner side of the battery or the upper side and the lower side of the sealing plate, and a wall thickness of the inner annular groove and a wall thickness of the connecting groove are set larger than a wall thickness of the outer annular groove.

(2) In the safety valve for a gastight battery having the above-mentioned constitution (1), the connecting groove formed of the straight thin wall which connects the outer annular groove and the inner annular groove is constituted of a lateral-directional connecting groove which is formed parallel to lateral planes of a side surface of the battery case, and a longitudinal-directional connecting groove which is formed parallel to longitudinal planes of the side surface of the battery case.

(3) In the safety valve for a gastight battery having the above-mentioned constitution (1) or (2), the outer annular groove formed of the annular thin wall and a stepped portion which defines an outer periphery of the safety valve are formed similar to each other in shape.

(4) In the safety valve for a gastight battery having any one of the above-mentioned constitutions (1) to (3), a plurality of connecting grooves formed of the straight thin wall are provided, and when a battery internal pressure is elevated, the deformation of the valve element starts at an intersection between the inner annular groove and the connecting groove formed of the straight thin wall, the deformation propagates toward the outer annular groove formed of the annular thin wall from the connecting groove so that the outer annular groove is broken whereby a gas generated in the battery is released at a stretch.

(5) According to another aspect of the present invention, there is provided a gastight battery in which a thin-wall valve element is formed on a sealing plate which seals an opening portion of a battery case, and the valve element is opened when a battery internal pressure becomes a predetermined pressure or more so as to release a gas in the battery to the outside of the battery, a safety valve of the gastight battery including: an outer annular groove formed of an annular thin wall which is formed on the periphery of the valve element and is provided for peeling off the whole valve element; an inner annular groove formed of an annular thin wall which is arranged in an area inside the outer annular groove; and a connecting groove formed of a straight thin wall which connects the outer annular groove and the inner annular groove, wherein the outer annular groove, the inner annular groove and the connecting groove are formed on the same side of the sealing plate which is an upper side of sealing plate forming an outer side of the battery, a lower side of the sealing plate forming an inner side of the battery or the upper side and the lower side of the sealing plate, and a wall thickness of the inner annular groove and a wall thickness of the connecting groove are set larger than a wall thickness of the outer annular groove.

The safety valve according to the present invention is constituted such that, by forming the inner annular groove in the inner area of the outer annular groove and by forming the longitudinal and lateral connecting grooves which connect the outer annular groove and the inner annular grooves, when a battery internal pressure is applied, the inner area receives deformation force which acts to deform the inner area whereby a large stress is applied to the inner annular groove and, due to the constitution in which one end of the connecting groove is connected to the inner annular groove, the deformation stress is concentrated on intersections between the inner annular groove and the connecting grooves.

As a result, when the battery internal pressure is elevated, the stress is propagated to the outer annular groove with the intersections between the inner annular groove and the connecting grooves as breaking starting points so that the outer annular groove which has the thinnest wall is broken. Accordingly, it is possible to realize an excellent advantageous effect that the safety valve is rapidly operated when the battery internal pressure is elevated thus rapidly and surely releasing a gas in the battery when the pressure is elevated.

DESCRIPTION OF THE PREFERRED EMBODIMENTS

An embodiment of a safety valve according to the present invention is explained in conjunction with FIG. 1 to FIG. 8 hereinafter.

Figure 1:
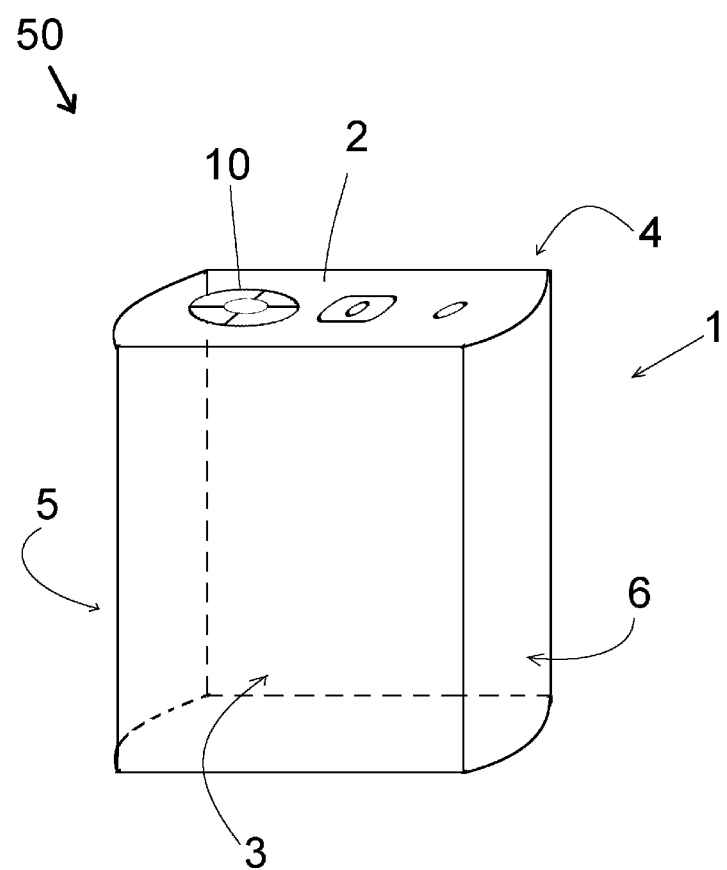
FIG. 1 is a perspective view of a gastight battery on which a safety valve according to an embodiment of the present invention is mounted.

As shown in FIG. 1, a gastight battery 50 on which a safety valve 10 according to the present invention is mounted has the following constitution. That is, in a battery case 1 which has a bottomed rectangular cylindrical shape and has an opening portion on an upper side thereof, a flat spiral electrode body which is constituted of a positive electrode in which an active material layer is formed on a core made of an aluminum alloy, a negative electrode in which an active material layer mainly made of graphite is formed on a core made of copper, and a separator which separates both these electrodes is stored.

Further, the inside of the battery case 1 is filled with an electrolytic solution, and a sealing plate 2 made of an aluminum alloy is fixed to the opening portion of the battery case 1 by laser welding thus sealing the opening portion of the battery case 1.

An aluminum alloy material used for forming the sealing plate 2 may be either an annealed material or a non-annealed material. In case of the non-annealed material, a non-hardened aluminum alloy material is used. In addition to a gasket, the sealing plate 2 includes a negative electrode tab 7 which extends from a negative electrode terminal cap of the electrode body stored in the battery case.

On the other hand, the positive electrode is electrically connected with the battery case 1 via a positive electrode tab.

Figure 2:
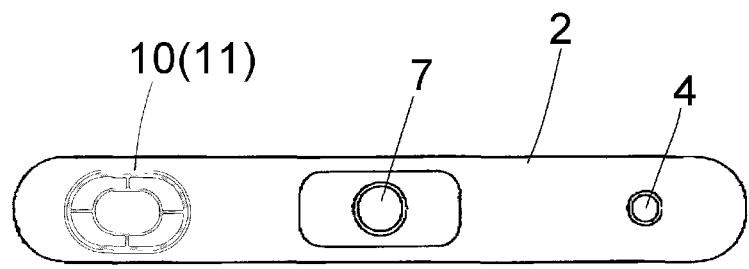
FIG. 2 is a plan view of a sealing plate on which the safety valve according to the embodiment of the present invention is mounted.

As shown in FIG. 2, the safety valve 10 made of an aluminum alloy is mounted on the sealing plate 2 in a state where the safety valve 10 is integrally formed with the sealing plate 2.

Figure 3:
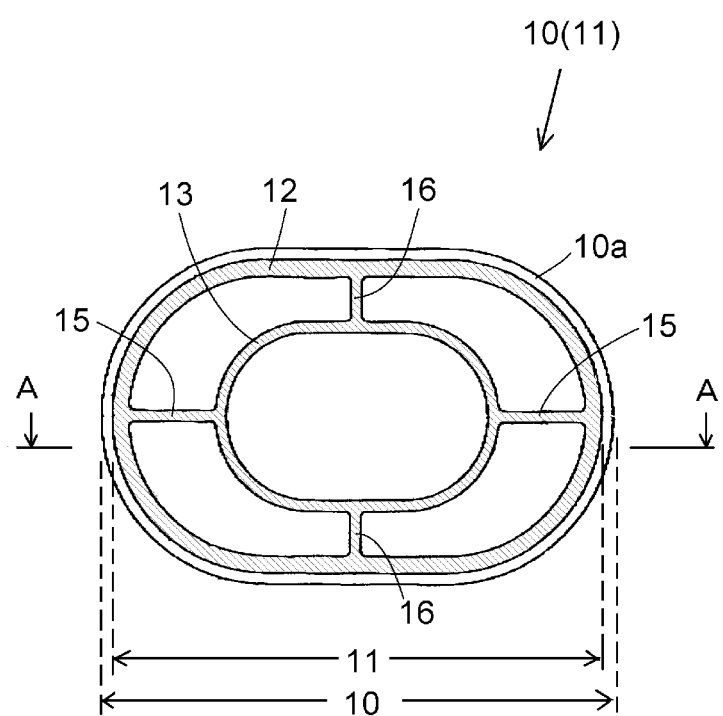
FIG. 3 is an enlarged plan view of the safety valve according to the embodiment of the present invention.

As shown in FIG. 3 which is an enlarged view of the safety valve, the safety valve 10 includes a stepped portion 10a formed of a thin wall which defines a periphery of the safety valve 10, and a valve element 11 for forming an opened hole for releasing an inner gas. An outer annular groove 12 formed of a thin wall and having an oval planar shape is formed along an inner side of the stepped portion 10a. When the battery internal pressure becomes a predetermined value or more, the outer annular groove 12 is broken so that the whole valve element 11 is peeled off whereby the opened hole is formed (opened) thus releasing a gas in the battery case 1 to the outside.

From a viewpoint of making a large opened hole for releasing an inner gas, it is desirable to form the outer annular groove 12 in a similar shape and concentrically with the stepped portion 10*a* of the safety valve 10.

Further, an inner annular groove 13 formed of an annular thin wall is formed in an area inside the outer annular groove 12. Connecting grooves formed of a straight-line thin wall which connect the outer annular groove 12 and the inner annular groove 13 are constituted of lateral-directional connecting grooves 15 which are formed parallel to lateral planes 3, 4 of a side surface of the battery case 1, and longitudinal-directional connecting grooves 16 which are formed parallel to longitudinal planes 5, 6 of the side surface of the battery case 1.

In FIG. 3, since the safety valve 10 has an elliptical planar shape, the outer annular groove 12 and the inner annular groove 13 also have similar elliptical planar shapes. However, the safety valve 10, the outer annular groove 12 and the inner annular groove 13 may have a circular planar shape.

Figure 4:
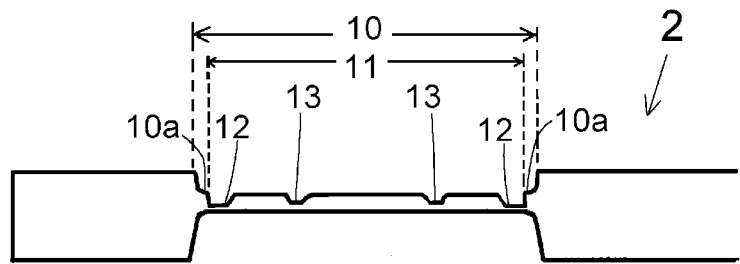
FIG. 4 is a cross-sectional view of the safety valve in FIG. 3 taken along a line A-A.

As shown in FIG. 4 which is a cross-sectional view taken along a line A-A in FIG. 3, to ease the breaking of the outer annular groove 12 when an battery internal pressure case 1 is increased, with respect to the cross-sectional shape of the outer annular groove 12, the annular groove is formed by forming a V-shaped notch or a U-shaped notch in the thickness direction by press molding.

Further, it is desirable that the cross-sectional shape of the inner annular groove 13, the cross-sectional shape of the lateral-directional connecting grooves 15, and the cross-sectional shape of the longitudinal-directional connecting grooves 16 are formed into a V-shape or a U-shape in the same manner as the cross-sectional shape of the outer annular groove 12. To make the breaking of the outer annular groove 12 occur first, it is desirable that remaining wall thicknesses (wall thicknesses) of the inner annular groove 13, the lateral-directional connecting grooves 15 and the longitudinal-directional connecting grooves 16 are set larger than a remaining wall thickness (wall thickness) of the outer annular groove 12.

In this embodiment, the remaining wall thicknesses of the inner annular groove 13, the lateral-directional connecting grooves 15 and the longitudinal-directional connecting grooves 16 are set to 50 to 120 µm, and the remaining wall thickness of the outer annular groove 12 is set to 20 to 90 µm.

Further, the outer annular groove 12, the inner annular groove 13, the lateral-directional connecting grooves 15, and the longitudinal-directional connecting grooves 16 which have the V-shaped cross section or the U-shaped cross section may be formed not only on an upper side of the sealing plate 2 but also on a lower side or on both sides of the sealing plate 2.

Figure 5:
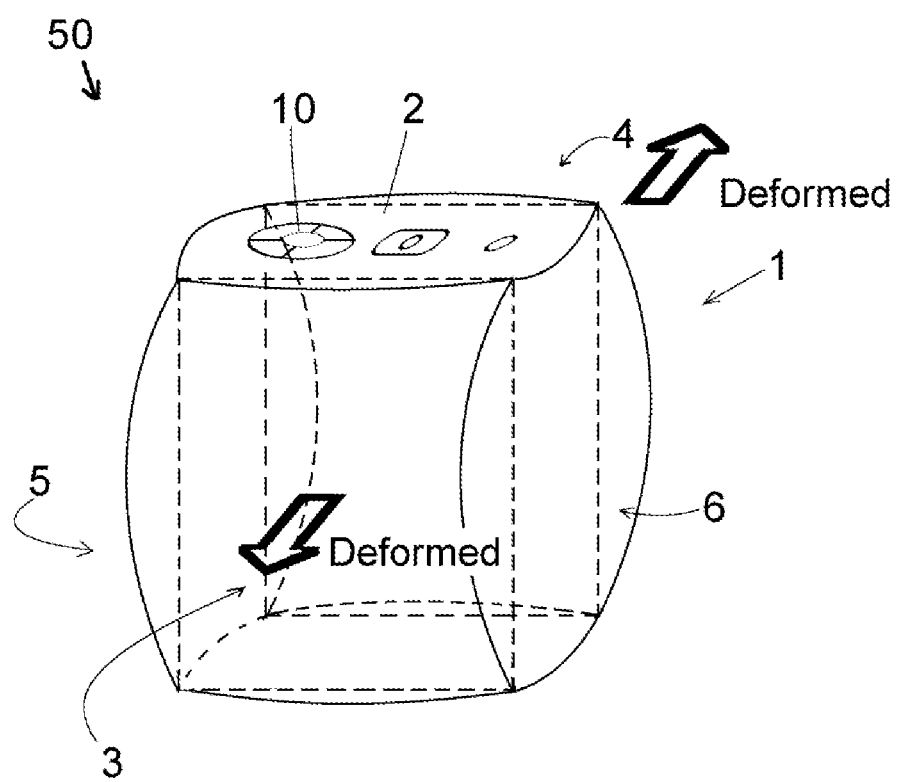
FIG. 5 is a perspective view showing a battery in a state in which a battery case is bulged due to a gas generated in the battery.

FIG. 5 is a perspective view showing the battery in a state where the battery case 1 is bulged due to a gas generated in the gastight battery 50. That is, when the gastight battery 50 is deformed by the internal pressure due to the generation of an abnormal gas in the battery, deformation amounts of the lateral planes 3, 4 on the side surface of the battery case 1 which extend in the downward direction perpendicular to the longitudinal direction of the sealing plate 2 become larger than deformation amounts of the longitudinal planes 5, 6 of the side surface of the battery case 1.

This is because areas of the lateral planes 3, 4 are larger than areas of the longitudinal planes 5, 6 which extend perpendicular to the longitudinal direction of the sealing plate 2 so that the total pressure which the lateral planes 3, 4 receive due to the gas pressure becomes larger than the total pressure that the longitudinal planes 5, 6 receive due to the gas pressure.

Figure 6:
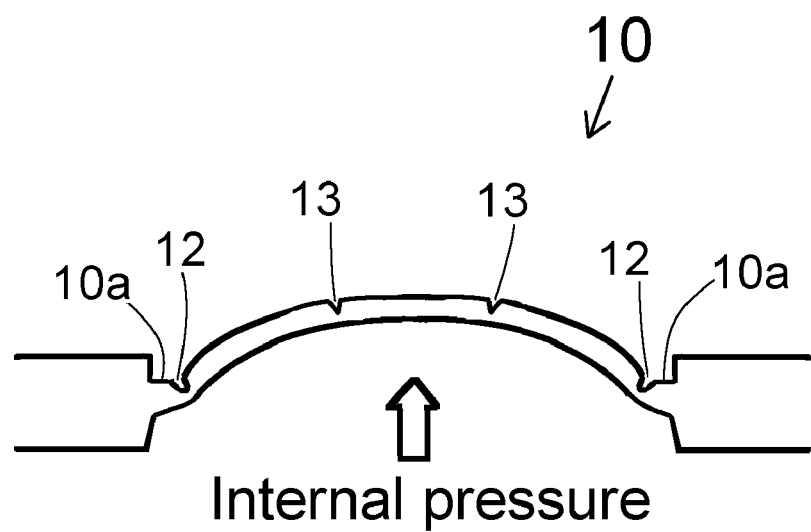
FIG. 6 is a cross-sectional view showing the safety valve according to the embodiment of the present invention in a deformation state when a battery internal pressure is increased.

As shown in FIG. 6 which is a cross-sectional view of the safety valve, when the battery internal pressure is increased, the safety valve 10 having a thin wall is deformed in a dome-like shape toward the outside due to the internal pressure. That is, for an effective operation of the safety valve 10 (releasing of the valve element 11), it is necessary to release an inner gas at a stretch by breaking the outer annular groove 12 due to the internal pressure of the gas generated in the battery by taking both the deformation of the lateral planes 3, 4 of the side surface of the battery case 1 shown in FIG. 5 and the dome-like deformation of the safety valve 10 shown in FIG. 6 into consideration.

That is, when the internal pressure becomes high due to the generation of the gas in the inside of the gastight battery 50, the safety valve 10 receives a force which intends to deform the safety valve 10 into a dome-like shape by bulging such that a center area of the safety valve 10 becomes an uppermost portion. However, in the safety valve of this embodiment, by forming the inner annular groove 13 and the straight-line lateral-directional connecting grooves 15 and the straight-line longitudinal-directional connecting grooves 16 which are connected to the inner annular groove 13 respectively, firstly, a large stress is applied to connecting portions between the inner annular groove 13 and the straight-line lateral-directional connecting grooves 15 and the straight-line longitudinal-directional connecting grooves 16 which are connected to the inner annular groove 13.

Figure 7:
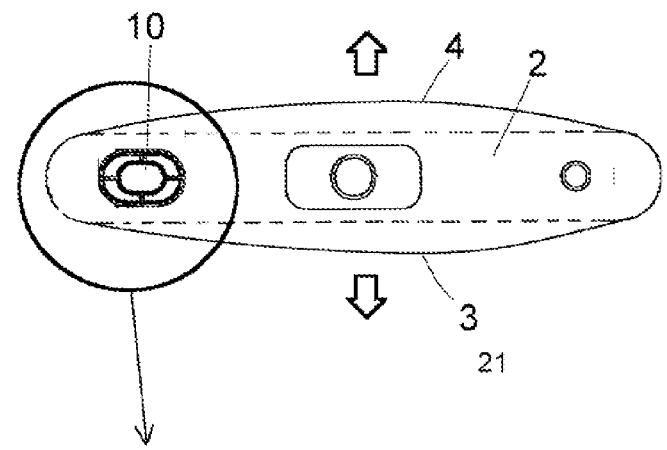
FIG. 7 is an explanatory view showing a state of stress applied to the safety valve when the battery internal pressure is increased in the safety valve according to the embodiment of the present invention.
Figure 7:
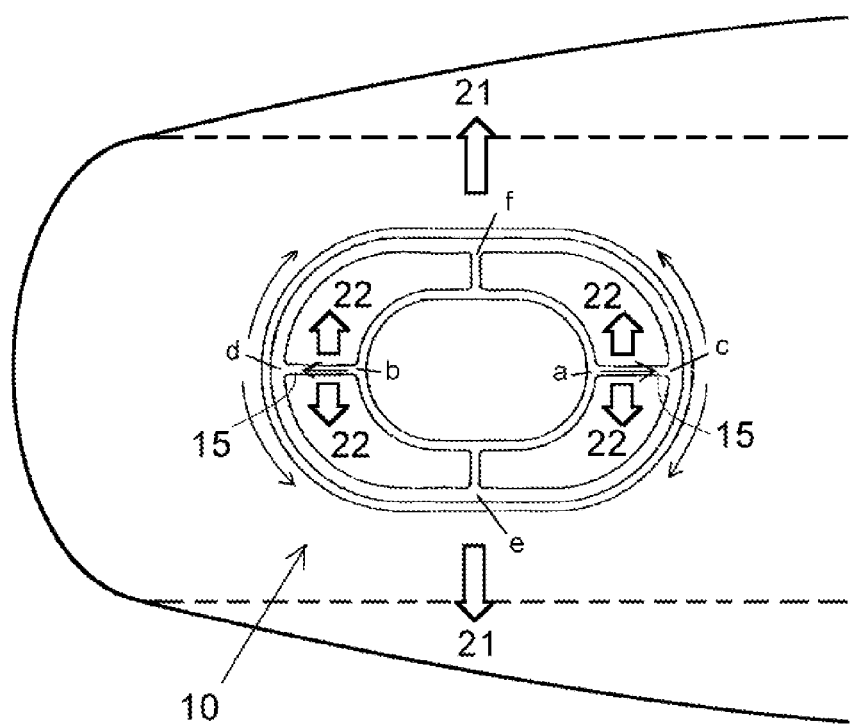

Since the inner annular groove 13 is connected to the straight-line lateral-directional connecting grooves 15, as shown in FIG. 7 which is an explanatory view showing a state of a stress applied to the safety valve 10, due to a stress 21 which is generated by the deformation of the lateral planes 3, 4 of the battery case 1, a stress 22 generated by the deformation of the lateral-directional connecting grooves 15 and a stress generated by the dome-like deformation of the safety valve (see FIG. 6), the above-mentioned stresses are concentrated on intersections a, b between the inner annular groove 13 and the lateral-directional connecting grooves 15, 15 which are connected to the inner annular groove 13.

As a result, when the battery internal pressure is elevated, strain for breaking the valve element 11 surely progresses from the intersections a, b between the inner annular groove 13 and the lateral-directional connecting grooves 15, 15 which are connected to the inner annular groove 13, and the strain is propagated in the direction a→c→e, in the direction a→c→f, in the direction b→d→e and in the direction b→d→f. Accordingly, a crack occurs in the outer annular groove 12 having the smallest wall thickness so that the valve element 11 of the safety valve 10 is opened by breaking (the safety valve being operated rapidly) whereby a gas in the battery is released at a stretch.

In this embodiment, it is explained that a deformation amount of the battery case 1 is increased on the lateral planes 3, 4 so that the stress is propagated to the lateral-directional connecting grooves 15. However, when the shape of the battery case is not a flattened shape but is a shape similar to a three-dimensional shape, the stress is propagated also to the longitudinal-directional connecting grooves 16.

<Manufacturing Method of Safety Valve and Battery>

Next, a manufacturing method of the safety valve and the battery according to this embodiment is explained.

The thin-wall stepped portion 10*a* which defines the safety valve is formed on the sealing plate 2 at a predetermined position by press forming. Also on the sealing plate 2 at a predetermined position, by press forming, the outer annular groove 12 which forms the valve element 11 to be peeled off inside the stepped portion 10*a*, the inner annular groove 13 which is formed inside the outer annular groove 12, and the lateral-directional connecting grooves 15 and the longitudinal-directional connecting grooves 16 which connect the outer annular groove 12 and the inner annular groove 13 to each other are formed integrally with the sealing plate 2.

Thereafter, the gasket and the like are mounted on the sealing plate 2, and the sealing plate 2 is welded to the opening portion of the battery case 1 by laser welding. Then, an electrolytic solution is filled in the battery case 1 through the filling port 7 formed in the sealing plate 2 thus manufacturing the gastight battery.

<Manner of Operation and Advantageous Effects of the Embodiment>

In this manner, by forming the inner annular groove 13 in the area inside the outer annular groove 12 of the safety valve 10 and by forming the lateral-directional connecting grooves 15 and the longitudinal-directional connecting grooves 16 which connect the inner annular groove 13 and the outer annular groove 12 to each other, when a battery internal pressure is applied to the safety valve 10, the safety valve 10 receives a force which intends to deform the safety valve 10 mounted on the battery case 1 into a dome-like shape so that a large stress is applied to the inner annular groove 13 first.

Since respective one ends of the connecting grooves 15, 16 are connected to the inner annular groove 13, deformation stress is concentrated on the intersections between the inner annular groove 13 and the connecting grooves 15, 16.

As a result, when the battery internal pressure is elevated, the stress is propagated to the outer annular groove 12 with the intersections between the inner annular groove 13 and the connecting grooves 15, 16 as breaking starting points and hence, the outer annular groove 12 formed of a thinnest wall is broken whereby the safety valve is operated rapidly.

EXAMPLE

Safety valves are manufactured using an aluminum alloy plate, and the safety valves are fixed to battery cases by laser welding thus forming dummy batteries of examples.

Figure 8A:
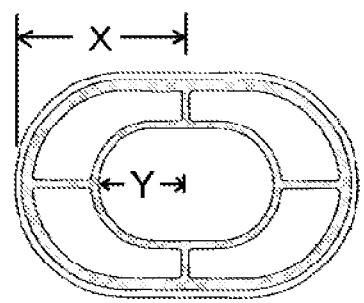
FIGS. 8A and 8B are comparison examples of two batteries.
Figure 8B:
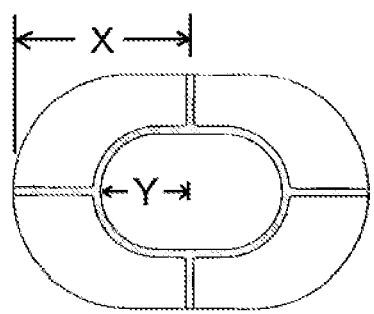

As the dummy batteries of the examples, two kinds of dummy batteries are prepared, wherein a thickness (remaining wall thickness) of an outer annular groove of one safety valve is set to 30 μm (example 1 shown in FIG. 8A), and a thickness (remaining wall thickness) of an outer annular groove of the other safety valve is set to 50 μm (example 2 shown in FIG. 8B). Remaining wall thickness of the inner annular groove is set to 70 μm in the example 1 and 90 μm in the example 2 respectively.

Further, comparison examples where a rate between a distance Y from the center of the safety valve to the inner annular groove and a radius X of the safety valve is changed from each other are prepared and are subjected to an experiment.

Here, a distance between the center of the safety valve 10 and a stepped portion 10a of the safety valve is used as the radius X.

As a comparison example, a dummy battery having an annular groove which is not a duplicate annular groove consisting of an inner annular groove and an outer annular groove is prepared. In this case, a remaining wall thickness of only the outer annular groove is set to 30 μm.

In the examples and the comparison examples, since the safety valves have an elliptical shape, the comparison is made with respect to the longitudinal diameter of the safety valve.

TABLE 1

|  | example 1 | example 2 | comparison example 1 | comparison example 2 | comparison example 3 |
|---|---|---|---|---|---|
| remaining wall thickness (μm) | 30 μm | 50 μm | 30 μm | 30 μm | 30 μm |
| distance Y from center to inner annular groove | X/3 | X/3 | X/3 | 2X/3 | X |
| average operating pressure (MPa) (irregularities) | 1.21 (1.15 to 1.28) | 1.87 (1.8 to 1.95) | 1.22 (1.15 to 1.30) | 1.40 (1.32 to 1.48) | 1.62 (1.56 to 1.69) |
| opened area | opened at outer annular groove | opened at outer annular groove | battery case exploded | opened at inner annular groove and straight-line connecting groove | opened at outer annular groove |

Note:
Explanation of the distance from the center to the inner annular groove
X = distance between the center and the stepped portion 10a of the safety valve <Operating Pressure Test>

An operating pressure of the safety valve is checked by applying an air pressure to the inside of the dummy batteries.

The operating pressure test is performed in such a manner that air is gradually filled into the dummy battery through a filling port 7 formed in the sealing plate 2, and an air pressure when the safety valve is operated is detected as an operating pressure. The result of the operating pressure test is shown in Table 1. The number of specimens is 20 for each battery.

As can be understood from the result shown in Table 1, in the example 1 where the remaining wall thickness of the safety valve is set to 30 μm and the distance from the center of the safety valve to the inner annular groove is set to ⅓X, the average operating pressure is 1.21 MPa.

In the example 2 where the remaining wall thickness of the safety valve is set to 50 μm and the distance from the center of the safety valve to the annular groove is set to ⅓X, the average operating pressure is 1.87 MPa.

Further, in the comparison example 1 where the remaining wall thickness of the safety valve is set to 30 μm and the distance from the center of the safety valve to the groove is set to ⅓X, the average operating pressure is 1.22 MPa.

In the comparison example 2 where the remaining wall thickness of the safety valve is set to 30 μm and the distance from the center of the safety valve to the inner annular groove is set to ⅔X, the average operating pressure is 1.40 MPa.

In the comparison example 3 where the remaining wall thickness of the safety valve is set to 30 μm and the distance from the center of the safety valve to the inner annular groove is set to approximately X, the average operating pressure is 1.62 MPa.

<Opened Area Test>

Next, an operation state of the safety valves of this embodiment is tested. A method of testing the operation state is performed as follows. That is, an actual gastight battery which mounts a sealing plate thereon and is hermetically sealed is placed on an iron plate which is heated to 250° C., and the gastight battery is rapidly heated so as to generate a gas in the battery thus intentionally operating the safety valve. Then, an opened area is checked.

When the opened area at the time of operating the safety valve is small, a suddenly generated gas cannot be released at a stretch and hence, the battery case is exploded. Accordingly, the safety valve is required to have a large opening area.

In this opened area test, the safety valves of the examples 1, 2 can release the generated gas at a stretch by opening (blowing off) the valve element 11 at the outer annular groove 12 where the opened area becomes maximum.

To the contrary, in the safety valve of the comparison example 1, although the annular groove is formed, the annular groove is formed at the position where the distance from the center to the annular groove is ⅓ of the radius of the safety valve and hence, the rapidly generated gas cannot be released at a stretch whereby the battery case is exploded.

Although the safety valve of the comparison example 1 exhibits the substantially equal operating pressure as the example 1, the opened area is small.

In the safety valve of the comparison example 2, the annular groove is formed at the position where the distance from the center to the annular groove is ⅔ of the radius of the safety valve so that the radius of the annular groove is large. Accordingly, a stress generated on the annular groove due to the dome-like deformation of the safety valve is not propagated to the connecting grooves so that cracks occur in the annular groove and the connecting grooves respectively. The rapidly generated gas is released through the cracks and hence, there is no case where the valve element is peeled off at the annular groove and is blown off.

In the safety valve of the comparison example 3, the inner gas is released at the outer annular groove by setting the distance from the center of the safety valve to the annular groove to approximately X. However, the safety valve of the comparison example 3 is provided with neither the inner annular groove nor the connecting groove and hence, when the safety valve of the comparison example 3 has the same remaining wall thickness (30 μm) as the safety valve of the example 1, an operating pressure (1.62 MPa) becomes higher than an operating pressure (1.21 MPa) of the safety valve of the embodiment 1 so that the safety valve cannot be operated at a low pressure under a state where the inner gas pressure is rapidly elevated.

The remaining wall thickness of the outer annular groove is relevant to fall strength such that the larger the remaining wall thickness, the higher the fall strength becomes. On the other hand, the larger the remaining wall thickness, the safety valve cannot be rapidly operated at a low pressure.

From these results, the safety valves of the examples can lower the operating pressure and can increase the opened area compared to the safety valves of the comparison examples.

[Industrial Applicability]

According to the safety valve of the present invention, by forming the inner annular groove and the longitudinal and lateral connecting grooves for connecting the outer annular groove and the inner annular groove to each other within the area inside the outer annular groove, when the battery internal pressure is applied to the safety valve, the inner area receives a force which intends to deform the safety valve so that a large stress is applied to the inner annular groove. Since one end of the connecting groove is connected to the inner annular groove, a deformation stress is applied to the intersection between the inner annular groove and the connecting groove in a concentrated manner. Accordingly, when the battery internal pressure is elevated, the stress propagates to the outer annular groove using the intersection between the inner annular groove and the connecting groove as a breaking starting point, and the thinnest outer annular groove is broken so that safety valve is operated rapidly when the battery internal pressure is elevated whereby it is possible to rapidly and surely release a gas in the battery when the battery internal pressure is elevated.

Accordingly, the safety valve of the present invention is preferably applicable to the gastight battery and possesses extremely high industrial applicability.

What is claimed is:

1. A safety valve for a gastight battery in which a thin-wall valve element is formed on a sealing plate which seals an opening portion of a battery case, and the valve element is opened when a battery internal pressure becomes a predetermined pressure or more so as to release a gas in the battery to the outside of the battery, the safety valve comprising:
    an outer annular groove formed of an annular thin wall which is formed on the periphery of the valve element and is provided for peeling off the whole valve element;
    an inner annular groove formed of an annular thin wall which is arranged in an area inside the outer annular groove; and
    a connecting groove formed of a straight thin wall which connects the outer annular groove and the inner annular groove, wherein
    the outer annular groove, the inner annular groove and the connecting groove are formed on the same side of the sealing plate which is an upper side of sealing plate arranged forming an outer side of the battery, a lower side of the sealing plate forming an inner side of the battery or the upper side and the lower side of the sealing plate, and
    a wall thickness of the inner annular groove and a wall thickness of the connecting groove are set larger than a wall thickness of the outer annular groove.

2. A safety valve for a gastight battery according to claim 1, wherein the connecting groove formed of the straight thin wall which connects the outer annular groove and the inner annular groove is constituted of a lateral-directional connecting groove which is formed parallel to lateral planes of a side surface of the battery case, and a longitudinal-directional connecting groove which is formed parallel to longitudinal planes of the side surface of the battery case.

3. A safety valve for a gastight battery according to claim 1, wherein the outer annular groove formed of the annular thin wall and a stepped portion which defines an outer periphery of the safety valve are formed similar to each other in shape.

4. A safety valve for a gastight battery according to claim 1, wherein a plurality of connecting grooves formed of the straight thin wall are provided, and when a battery internal pressure is elevated, the deformation of the valve element starts at an intersection between the inner annular groove and the connecting groove formed of the straight thin wall, the deformation propagates toward the outer annular groove formed of the annular thin wall from the connecting groove so that the outer annular groove is broken whereby a gas generated in the battery is released at a stretch.

5. A gastight battery in which a thin-wall valve element is formed on a sealing plate which seals an opening portion of a battery case, and the valve element is opened when a battery internal pressure becomes a predetermined pressure or more so as to release a gas in the battery to the outside of the battery, a safety valve of the gastight battery comprising:
    an outer annular groove formed of an annular thin wall which is formed on the periphery of the valve element and is provided for peeling off the whole valve element;

an inner annular groove formed of an annular thin wall which is arranged in an area inside the outer annular groove; and a connecting groove formed of a straight thin wall which connects the outer annular groove and the inner annular groove, wherein the outer annular groove, the inner annular groove and the connecting groove are formed on the same side of the sealing plate which is an upper side of sealing plate forming an outer side of the battery, a lower side of the sealing plate forming an inner side of the battery or the upper side and the lower side of the sealing plate, and a wall thickness of the inner annular groove and a wall thickness of the connecting groove are set larger than a wall thickness of the outer annular groove.

* * * * *